United States Patent [19]
DiAngelo

[11] Patent Number: 5,336,414
[45] Date of Patent: Aug. 9, 1994

[54] METHODS FOR INHIBITING THE DEPOSITION OF PROTEINACEOUS MATERIALS ON HEAT TRANSFER SURFACES

[75] Inventor: Nancy A. DiAngelo, Feasterville, Pa.
[73] Assignee: Betz Laboratories, Inc., Trevose, Pa.
[21] Appl. No.: 32,069
[22] Filed: Mar. 17, 1993
[51] Int. Cl.$^5$ .............................................. C02F 5/14
[52] U.S. Cl. ..................................... 210/698; 127/68; 159/DIG. 13; 203/7; 252/180
[58] Field of Search ............... 127/16, 65, 67–70; 159/DIG. 13; 203/6, 7; 210/698–701; 252/180, 181, DIG. 1; 426/271

[56] References Cited

U.S. PATENT DOCUMENTS

| | | |
|---|---|---|
| 1,918,812 | 7/1933 | Kerr et al. |
| 3,362,829 | 1/1968 | Landfried et al. ................... 99/14 |
| 3,483,033 | 12/1969 | Casey .................................. 127/61 |
| 3,880,824 | 4/1975 | Rad et al. ....................... 260/112 G |
| 4,270,974 | 6/1981 | Greenfield et al. ............. 159/47 R |
| 4,440,792 | 4/1984 | Bradford et al. .................. 210/698 |
| 4,662,990 | 5/1987 | Bonanno ......................... 210/195.1 |
| 4,929,361 | 5/1990 | Polizzotti ........................... 210/698 |

Primary Examiner—Peter A. Hruskoci
Attorney, Agent, or Firm—Alexander D. Ricci; Philip H. Von Neida

[57] ABSTRACT

Methods for controlling the formation of proteinaceous fouling deposits in high temperature evaporators and concentrators as employed in processing steepwater in the wet milling of corn. The methods comprise adding lecithin, or a long chain fatty acid to the steepwater in an amount ranging from about 150 parts per million to about 500 parts per million steepwater.

9 Claims, 2 Drawing Sheets

METHODS FOR INHIBITING THE DEPOSITION OF PROTEINACEOUS MATERIALS ON HEAT TRANSFER SURFACES

FIELD OF THE INVENTION

The present invention is directed to methods for controlling organic deposition on heat transfer Surfaces. Lecithin and long-chained fatty acids are employed to control organic deposition in high temperature evaporators which are employed for concentrating steepwater in the wet milling of corn.

BACKGROUND OF THE INVENTION

During the wet milling of corn, fouling of the equipment by protein-containing fluids can occur. The wet milling processing of shelled corn is employed to obtain staple products such as corn oil, dextrose, corn syrup, high fructose corn syrup, dextrins, dry starches and feeds. The principle steps in the wet milling of corn include steeping, milling, recovering and processing. During the steeping process, corn kernels are softened by soaking in a hot, dilute solution of sulfurous acid (i.e., water/sulfur dioxide). The softened kernels are then passed through grinding mills and separators where the germ is removed and the starch and gluten are separated from the coatset hull and fibers. The starch is then separated from the gluten which is added to the fibrous material and processed into a high protein animal feed. The starch is recovered as dry starch or further processed into dextrose and fructose. The sulfurous acid steepwater initially used to soften the corn contains solubles which are recovered for use in feeds. The steepwater solids are recovered by evaporation and drying. The solids recovered from evaporating and drying the steepwater are used as additives to livestock feeds to enhance their nutritional value.

The deposition of organic, proteinaceous materials in the steepwater evaporators limits throughput and is a bottle-neck in the wet milling corn process. To cope with such organic deposition fouling, such evaporators are typically boiled out with an acid and/or caustic solution. Such boil-out procedures result in undesirable downtime for the equipment. The present invention is directed to a process for controlling deposition in such evaporators so as to minimize the requirement for such boil-out procedures.

SUMMARY OF THE INVENTION

The present invention provides for methods for inhibiting the deposition of organic matter on heat transfer surfaces. The methods provide for employing lecithin or a long chain fatty acid to inhibit the deposition of organic, proteinaceous matter on the surfaces of evaporators and concentrators.

DESCRIPTION OF THE RELATED ART

U.S. Pat. No. 3,362,829 discloses a process for coating powdered vital wheat gluten with a nonionic hydrophilic lipid selected from the class consisting of monoglycerides, salts of lactylic esters of fatty acids, polyoxyethylene stearate and stearyl monoglyceridyl citrate. The coating of the powdered wheat gluten with such nonionic hydrophilic lipids is disclosed as controlling wetting of the vital wheat gluten thereby controlling cohesion of the gluten upon hydrogenation. The use of polyoxyethylene sorbitan monostearate in combination with the hydrophilic lipids is also disclosed. The surface active agent, i.e., polyoxyethylene sorbitan monostearate is included as an aid for the initial dispersion of the vital wheat gluten and has no inhibiting effect on coalescence of the vital wheat gluten. This hydrating process is typically carried out at neutral pH and relatively low temperatures so as not to substantially denature the gluten.

U.S. Pat. No. 3,880,824 teaches a gluten/lipid complex and process for preparing a gluten/lipid complex in which vital wheat gluten complexes with lipids are prepared which are resistant to particle corrosion. The finely divided vital wheat gluten is reacted with ionic and nonionic fatty substances selected from the group consisting of fatty acid chlorides, fatty monoglycerides, lactylic esters of fatty acids, phospholipids and sorbitan fatty acid esters in the presence of a mild base catalyst. The phospholipids and lactylic esters of fatty acids yield comparable complexes in an acidic environment.

U.S. Pat. No. 1,918,812 discloses a treatment for steepwater from a wet corn milling operation which minimizes scale in the steepwater evaporators. The process comprises "incubating" the steepwater to allow-natural organisms and/or enzymes to convert the scale forming substances into non-scale forming substances. A carbohydrate may be added to the steepwater which may be agitated or aerated to hasten the desired effect of the organisms and/or enzymes.

U.S. Pat. No. 3,483,033 teaches an additive to control scale formation in evaporators used in the concentration of cane and beet sugar. The additive is a composition containing a hydrolyzed polyacrylamide and a protective colloid such as sodium alginate or carboxymethylcellulose and preferably one or more of (1) EDTA or disodium methylene diamine tetraacetic dihydrate, (2) a gluconate, and (3) a polyphosphate. The composition is added to sugar juice after clarification and before the evaporators to control scale deposition in the evaporators.

U.S. Pat. No. 4,929,361 teaches a method for inhibiting fouling in protein-containing fluids. The method employs a nonionic surfactant in hot, acidic steepwater evaporators and concentrators during a corn milling operation. Particularly effective at inhibiting fouling deposits are oxylated sorbitan R surfactants where R is monooleate, trioleate, monostearate, tristearate, monopalmitate, and monolaurate.

DETAILED DESCRIPTION OF THE INVENTION

Figure 1:
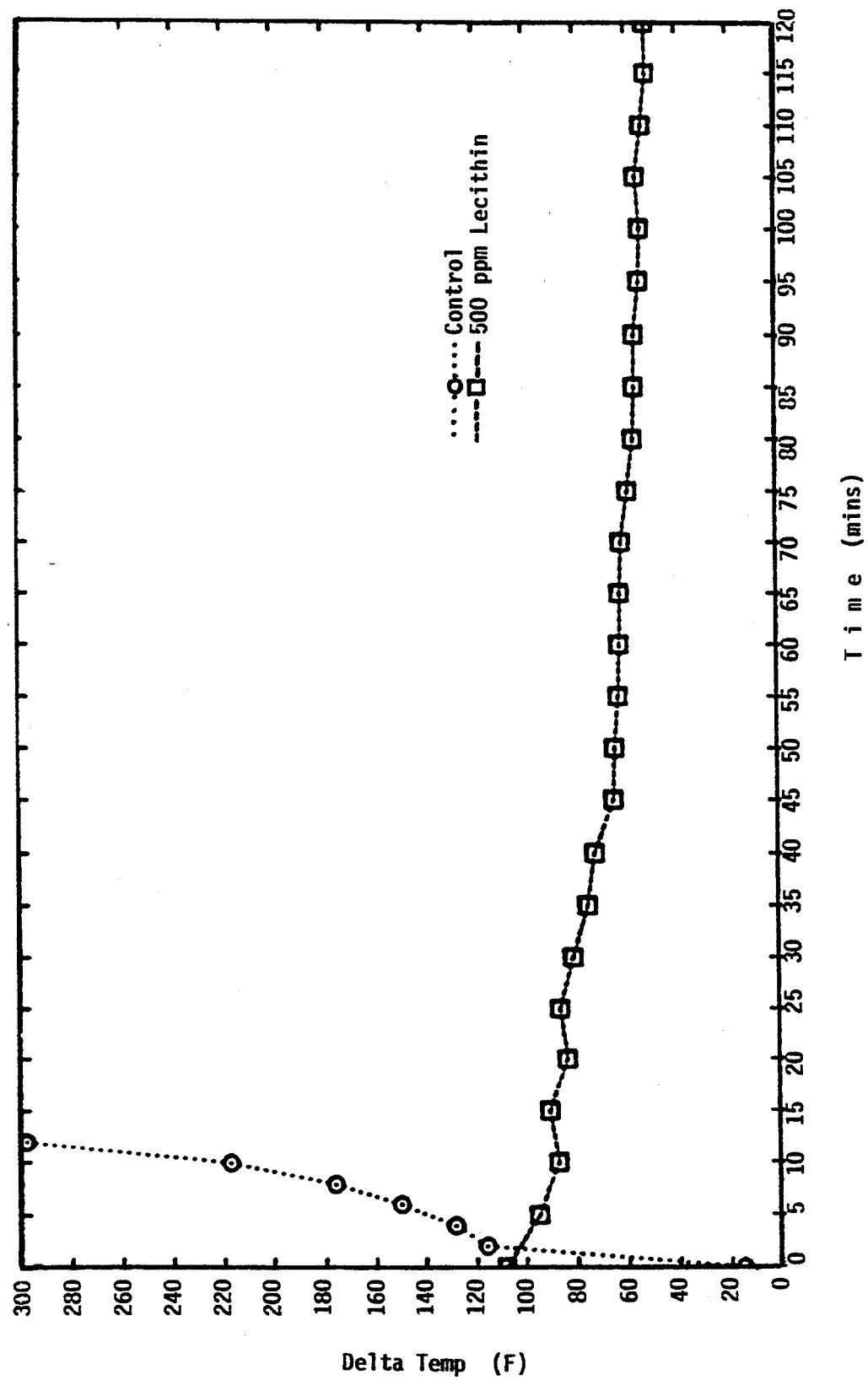
FIG. 1 is a graph of the temperature differential ($\Delta T$) between the liquor and the skin as a function of time for both control and lecithin treated systems.

The present invention is directed towards methods for inhibiting organic fouling of heat transfer surfaces in contact with an aqueous, acidic proteinaceous solution which comprises adding to said solution an effective inhibiting amount of lecithin or a long chain fatty acid.

This fouling occurs in evaporators and concentrators employed to concentrate hot, acidic steepwaters in corn wet milling operations. These steepwaters typically have a pH of about 4.0 due to the use of sulfurous acid in the hot steeping operation. The present inventor has discovered that lecithin or long chain fatty acids are effective at inhibiting fouling deposits. The preferred long chain fatty acid is decanoic acid but the present inventor anticipates that octanoic acid and stearic acid will also effectively inhibit fouling of the steepwaters.

As used herein, "long chain fatty acid" is defined as any fatty acid having a carbon chain of eight or greater that will help in inhibiting fouling in the steepwaters due to organic, proteinaceous matter.

Typically, fouling was removed by an acid and/or caustic boil-out process. Such boil-out processes result in production losses, increased wear on the evaporator tubing and increased costs for boil-out chemicals, manpower and steam. The present invention provides a process for inhibiting fouling of steepwater evaporators which minimizes the necessity of such boil-out operations.

The total amount of lecithin or long chain fatty acid used in the methods of the present invention as a fouling inhibitor is that amount which is sufficient to inhibit fouling and will, of course, vary according to the condition of the steepwater. At higher levels of fouling, larger amounts of the fouling inhibitor are generally required.

Preferably, the amount of fouling inhibitor added is from about 150 parts per million to about 500 parts per million parts based on solids content of the proteinaceous solution. More preferred are dosages approaching 500 parts per million but dosages exceeding this amount may not be economically effective.

The fouling inhibiting compounds of the present invention may be added to the steepwater using a suitable liquid carrier dispersing medium or solvent which is compatible with the steepwater. Preferably, a solution is provided and the solvent is selected from the group consisting of vegetable oil, animal fat, mineral oil or as a water dispersible emulsion. The antifouling compounds of the present invention may also be added to the steepwater as neat.

The data set forth below were developed and demonstrate the unexpected results occasioned by use of the invention. The following examples are included as being illustrations of the invention and should not be construed as limiting the scope thereof.

EXAMPLES

The effectiveness of the present invention at inhibiting fouling was determined in an apparatus which simulates the conditions in a steepwater evaporator. The test method employed a heated stainless steel probe suspended in a circulating stream of heated steepwater. The growth of fouling deposits on such a heated surface is not linear with time. As the fouling deposit grows, at a constant heat flux the fluid temperature is held constant, and the temperature of the probe surface increases due to the heat transfer resistance caused by the deposition. The temperature increase over time of the probe surface is a measure of the degree of fouling. In the testing, temperature change over time of the stainless steel probe was measured. In addition to monitoring temperature behavior, the weight of the deposit that accumulated on the heated probe and length of the time of the experiment were recorded.

FIG. 1 is a graph of the effects of lecithin added to evaporator steepwater. This utilized CPC E-802 steepwater with 54% solids, 88 ml/min flow, 95 volts and 155°–190° F. water temperature. As shown, the untreated control fouled rapidly as indicated by the change in temperature of over 300° F. in less than 15 minutes. 500 parts per million lecithin caused a reduction in probe temperature over a two hour period.

Figure 2:
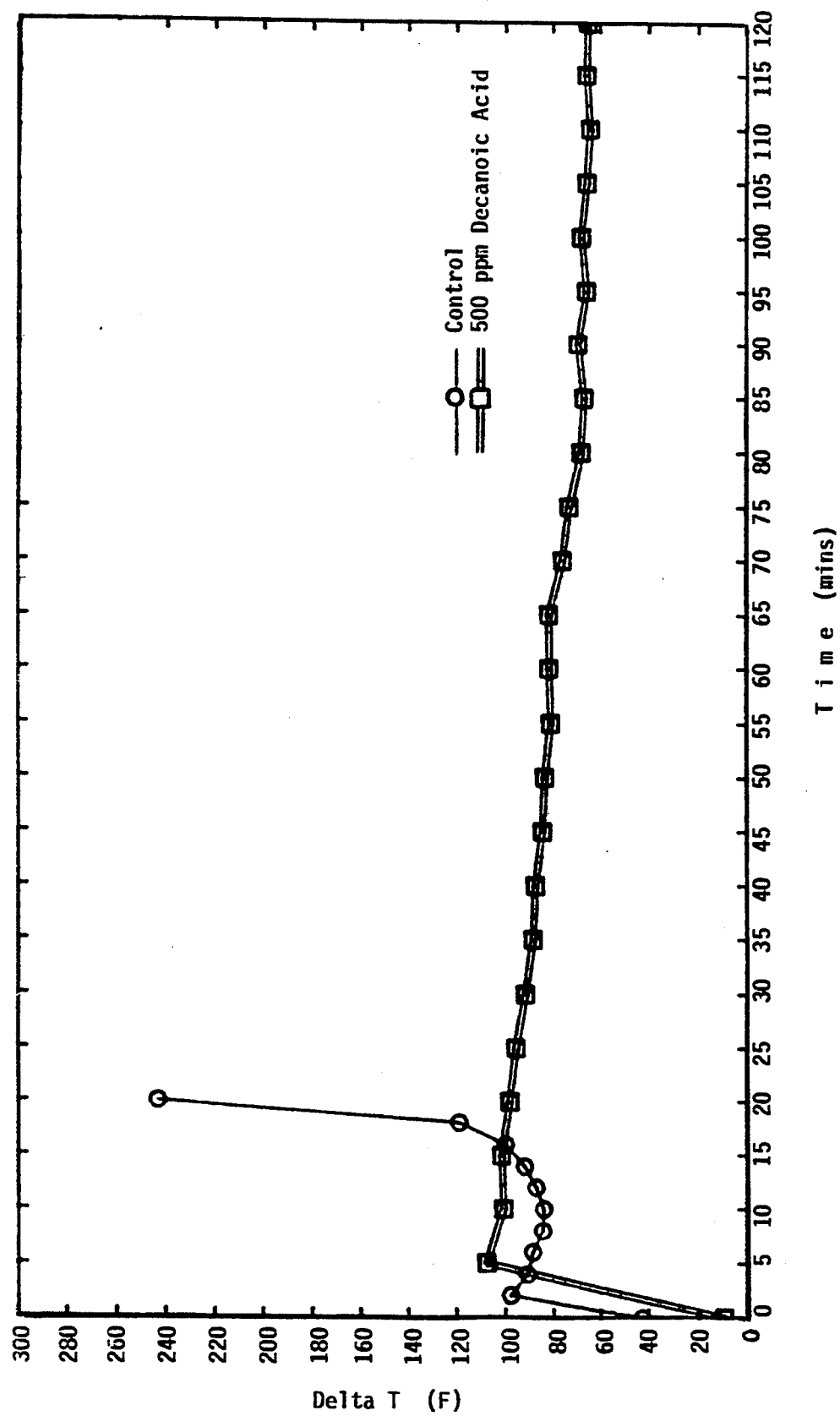
FIG. 2 is a graph of the temperature differential ($\Delta T$) between the liquor and the skin as a function of time for both control and decanoic acid treated systems.

FIG. 2 is a graph of the effects of decanoic acid added to evaporator steepwater. This utilized CPC E-802 steepwater with 55% solids, 88 ml/min flow, 95.volts and 160°–195° F. water temperature. As shown, the untreated control fouled rapidly as the probe temperature rose 200° F. in 20 minutes. A treatment of 500 parts per million decanoic acid resulted in a decrease in probe temperature over a two hour period. The weights of the deposits and % inhibition are reported in Tables I and II.

TABLE I

| Treatment (150 ppm active) | 160° F.–190° F. 88 ml/min 53%–57% solids | | |
|---|---|---|---|
| | Control Deposition Rate (g/min) | Treated Deposition Rate (g/min) | % Inhibition |
| Lecithin | 0.01945 | 0.002955 | 84.80 |
| Lecithin | 0.09496 | 0.002393 | 97.48 |
| Lecithin | 0.1155 | 0.1143 | 1.03 |
| Lecithin | 0.07642 | 0.007201 | 90.58 |
| Decanoic acid | 0.008232 | 0.002708 | 67.10 |
| Decanoic acid | 0.1257 | 0.1514 | −20.44 |

TABLE II

| Treatment (150 ppm active) | 160° F.–190° F. 88 ml/min 53%–57% solids | | |
|---|---|---|---|
| | Control Deposition Rate (g/min) | Treated Deposition Rate (g/min) | % Inhibition |
| Lecithin | 0.1461 | 0.002178 | 99.27 |
| Decanoic Acid | 0.1639 | 0.001255 | 99.25 |
| Decanoic Acid | 0.1112 | 0.002498 | 97.75 |
| Propionic Acid | 0.1570 | 0.1333 | 15.09 |

Deposition Rate = Deposit weight (gms)/duration of experiment (min)

% Inhibition = $\frac{\text{Control Deposition Rate} - \text{Treated Deposition Rate}}{\text{Control Deposition Rate}}$ As can be seen from FIGS. 1 and 2 and Tables I and II, the addition of lecithin or a long chain fatty acid to aqueous acidic wet corn milling steepwater has a profound effect on the fouling and deposition on a heated surface as measured by the change in the temperature of the heated surface over time.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what I claim is:

1. A method for inhibiting organic fouling of heat transfer surfaces in contact with an aqueous, proteinaceous solution wherein said proteinaceous solution is a wet corn milling steepwater having an acidic pH, comprising adding to said solution an effective inhibiting amount of lecithin.

2. The method as claimed in claim 1 wherein said lecithin is added to said solution in a solvent.

3. The method as claimed in claims 2 wherein said solvent is vegetable oil, animal fat, mineral oil or a water dispersible emulsion.

4. The method as claimed in claim 1 wherein said lecithin is added to said solution in an amount ranging from about 150 parts per million to about 500 parts per million based on solids content of the proteinaceous solution.

5. A method for inhibiting organic fouling of heat transfer surfaces in contact with an aqueous, proteinaceous solution wherein said proteinaceous solution is a wet corn milling steepwater having an acidic pH, comprising adding to said solution an effective inhibiting amount of a long chain fatty acid having a carbon chain length of eight or greater.

6. The method as claimed in claims 5 wherein said long chain fatty acid is decanoic acid.

7. The method as claimed in claim 5 wherein said long chain fatty acid having a carbon chain length of eight or greater is added to said solution in a solvent.

8. The method as claimed in claim 7 wherein said solvent is vegetable oil, animal fat, mineral oil or a water dispersible emulsion.

9. The method as claimed in claim 5 wherein said long chain fatty acid is added to said solution in an amount ranging from about 150 parts per million to about 500 parts per million based on solids content of proteinaceous solution.

* * * * *